United States Patent
Rus et al.

(10) Patent No.: US 11,295,162 B2
(45) Date of Patent: Apr. 5, 2022

(54) VISUAL OBJECT INSTANCE DESCRIPTOR FOR PLACE RECOGNITION

(71) Applicants: Massachusetts Institute of Technology, Cambridge, MA (US); ETH Zurich, Zurich (CH)

(72) Inventors: Daniela Rus, Weston, MA (US); Sertac Karaman, Cambridge, MA (US); Igor Gilitschenski, Cambridge, MA (US); Andrei Cramariuc, Zurich (CH); Cesar Cadena, Zurich (CH); Roland Siegwart, Zurich (CH)

(73) Assignees: Massachusetts Institute of Technology, Cambridge, MA (US); ETH Zurich, Zurich (CH)

( * ) Notice: Subject to any disclaimer, the term of this patent is extended or adjusted under 35 U.S.C. 154(b) by 166 days.

(21) Appl. No.: 16/671,525

(22) Filed: Nov. 1, 2019

(65) Prior Publication Data
US 2021/0133480 A1 May 6, 2021

(51) Int. Cl.
*G06K 9/62* (2006.01)
*G06F 16/587* (2019.01)
*G06F 16/58* (2019.01)

(52) U.S. Cl.
CPC ......... *G06K 9/6202* (2013.01); *G06F 16/587* (2019.01); *G06F 16/5866* (2019.01); *G06K 9/627* (2013.01); *G06K 9/628* (2013.01); *G06K 2009/6213* (2013.01)

(58) Field of Classification Search
CPC .......... G06K 2009/6213; G06K 9/628; G06K 9/627; G06K 9/6202; G06F 16/5866; G06F 16/587
See application file for complete search history.

(56) References Cited

U.S. PATENT DOCUMENTS

| | | | | |
|---|---|---|---|---|
| 9,443,314 | B1* | 9/2016 | Huang | G06K 9/00684 |
| 2013/0336583 | A1* | 12/2013 | Ernst | G06T 7/80 382/165 |
| 2014/0241616 | A1* | 8/2014 | Medvedovsky | G06Q 30/0275 382/156 |
| 2015/0016712 | A1* | 1/2015 | Rhoads | H04N 7/185 382/154 |

(Continued)

OTHER PUBLICATIONS

Redmon, Joseph, and Ali Farhadi. "YOLO9000: better, faster, stronger," In Proceedings of the IEEE conference on computer vision and pattern recognition, pp. 7263-7271, 2017.

(Continued)

*Primary Examiner* — Mia M Thomas
(74) *Attorney, Agent, or Firm* — Occhiuti & Rohlicek LLP

(57) ABSTRACT

An approach to place recognition from an image makes use of the detection of objects at a set of known places as well as at an unknown place. Images of the detected objects in an image of the unknown place are processed to yield respective numerical descriptors, and these descriptors are used to compare the unknown place to the known places to recognize the unknown place. At least some embodiments make use of a trained parameterized image processor to transform an image of an object to an object descriptor, and the training of the processor is meant to preserve distinctions between different instances of a type of object, as well as distinctions between entirely different types of objects.

18 Claims, 3 Drawing Sheets

(56) References Cited

U.S. PATENT DOCUMENTS

| | | | | |
|---|---|---|---|---|
| 2015/0098616 | A1* | 4/2015 | Gervautz | G06T 7/70 382/103 |
| 2015/0242707 | A1* | 8/2015 | Wilf | G06K 9/6256 382/159 |
| 2015/0294191 | A1* | 10/2015 | Zhang | G06N 20/00 382/160 |
| 2016/0027474 | A1* | 1/2016 | Chao | H04N 21/44008 386/241 |
| 2016/0180193 | A1* | 6/2016 | Masters | G06K 9/3216 382/218 |
| 2016/0275376 | A1* | 9/2016 | Kant | G06K 9/209 |
| 2016/0307420 | A1* | 10/2016 | DeLean | G06K 9/6202 |
| 2017/0178060 | A1* | 6/2017 | Schwartz | G06K 9/6267 |
| 2017/0286773 | A1* | 10/2017 | Skaff | G06N 20/00 |
| 2018/0047208 | A1* | 2/2018 | Marin | H04N 13/243 |
| 2018/0246964 | A1* | 8/2018 | Teichman | G06F 3/167 |

OTHER PUBLICATIONS

Galil, Zvi, "Efficient algorithms for finding maximum matching in graphs." ACM Computing Surveys (CSUR) 18, No. 1 (1986): 23-38.

T.-Y. Lin, M. Maire, S. Belongie, J. Hays, P. Perona, D. Ramanan, P. Dollar, and C. L. Zitnick, "Microsoft COCO: Common Objects in Context," In ECCV, 2014.

B. Zhou, H. Zhao, X. Puig, S. Fidler, A. Barriuso, and A. Torralba, "Scene Parsing through ADE20K Dataset," In CVPR, 2017.

F. Schroff, D. Kalenichenko, and J. Philbin, "FaceNet: A Unified Embedding for Face Recognition and Clustering," In CVPR, 2015.

Chang, Angel, Angela Dai, Thomas Allen Funkhouser, Maciej Halber, Matthias Niebner, Manolis Savva, Shuran Song, Andy Zeng, and Yinda Zhang. "Matterport3D: Learning from RGB-D data in indoor environments." In 7th IEEE International Conference on 3D Vision, 3DV 2017, pp. 667-676. Institute of Electrical and Electronics Engineers Inc., 2018.

Hou Yi et al. "Evaluation of Object Proposals and ConvNet Features for Landmark-based Visual Place Recognition," Journal of Intelligent and Robotic Systems, Kluwer Dordrecth, NL, vol. 92, No. 3, Nov. 7, 2017 (Nov. 7, 2017), pp. 505-520, XP036617922, ISSN: 0921-0296, DOI: 10.1007/S10846-017-0734-Y.

Niko Sunderhauf et al. "Place Recognition with ConvNet Landmarks: Viewpoint-Robust, Condition-Robust, Training-Free," Robotics: Science and Systems Xi, Jul. 13, 2015 (Jul. 13, 2015), XP055654028, DOI: 10.15607/RSS.2015.XI.022, ISBN: 978-0-9923747-1-6.

Everingham Mark et al "ThePascalVisual Object Classes Challenge: A Retrospective," International Journal of Computer Vision, Kluwer Academic Publishers, Norwell, US, vol. 111, No. 1, Jun. 25, 2014 (Jun. 25, 2014), pp. 98-136, XP035427827, ISSN: 0920-5691, DOI: 10.1007/S11263-014-0733-5.

Russakovsky Olga et al. "ImageNet Large Scale Visual Recognition Challenge," Internatioanl Journal of Computer Vision, Kluwer Academic Publishers, Norwell, US, vol. 115, No. 3, Apr. 11, 2015 (Apr. 11, 2015), pp. 211-252, XP035855862, ISSN: 0920-5691, DOI: 10.1007/S11263-014-0816-Y.

Joseph Redmon: "YOLO: Real-Time Object Detection," Dec. 24, 2017 (Dec. 24, 2017), XP55716222.

International Search Report dated Jul. 28, 2020 in PCT Application No. PCT/US2019/068657.

* cited by examiner

VISUAL OBJECT INSTANCE DESCRIPTOR FOR PLACE RECOGNITION

BACKGROUND

This application relates to place recognition, and more particularly relates to place recognition based on descriptors of objects at such places.

The widespread availability of low-cost camera systems allows for deployment of Simultaneous Localization and Mapping (SLAM) algorithms on numerous consumer products such as smartphones, virtual reality headsets, or consumer grade drones. At the same time, this technology serves as one of several positioning sources in autonomous driving. To unlock further commercial applicability, one of the main scientific challenges remains to be the creation of visual place recognition systems that are independent of viewpoint and appearance conditions even when operated in dynamic environments.

Some visual place-recognition approaches use a large number of local descriptors, such as Scale Invariant Feature Transform (SIFT) descriptors, or rely on whole-image descriptors such as GIST. Local descriptors are noisy, provide little contextual information, and perform poorly when lighting conditions change drastically. Their advantage, however, is that they can be used to calculate a transformation matrix between two matched images. On the other hand, global descriptors simultaneously describe the entire image in a compact form. They contain contextual information but can be slower and more prone to viewpoint changes.

Recent advances in object detection based on deep learning have created significant interest in using the detected objects as high-level navigation landmarks. Object detectors may provide information about an object class. However, the object class may not be sufficiently distinctive to constrain the search space for place recognition. Consequently, approaches for object-based loop-closure and place recognition typically rely on existing three-dimensional (3D) object models or the availability of depth information for object segmentation. However, storing and retrieving highly detailed object models may be prohibitive in large-scale environments, particularly when using mobile devices with limited memory, energy, or bandwidth. Thus, it is of considerable interest to recognize a place based on object instance matching without requiring a fill 3D object model.

SUMMARY

In a general aspect, an approach to place recognition from an image (or set of images) makes use of prior detection of objects at a set of known places as well as detection of objects at an unknown place. Images of the detected objects in an image of a known or an unknown place are processed to yield respective numerical descriptors. These computed descriptors are used to compare the unknown place to the known places to recognize the unknown place. At least some embodiments make use of a trained parameterized image processor to transform an image of an object to an object descriptor, and the training of the processor is meant to preserve distinctions between different instances of a type of object, as well as distinctions between entirely different types of objects. At least some embodiments allow for capturing less than all the known objects at a place and allow for ambiguity in the association of the detected objects and the known objects at known places. Some such approaches make use of graph-matching approach.

In one aspect, in general, a method for place recognition involves receiving an image acquired for an unknown place. A set of descriptors are computed from the image for the unknown place. This computing includes locating objects from a first set of predefined classes in the image and determining a corresponding region of the image for each located object. Each descriptor is computed to comprise a numerical vector representing a respective located object based at least on the associated region of the image. A database of reference records is accessed in which each reference record is associated with a known place and includes a set of descriptors previously computed for objects in a corresponding image of that known place. The set of descriptors from the image for the unknown place is matched with the reference records of the database. This matching includes, for each reference record of at least some of the reference records, determining a score representing a match between descriptors computed from the image of the unknown place and descriptors of the reference record. A best matching reference record of the database is determined, and the unknown place is recognized as being a place associated with the best matching record of the database.

In another aspect, in general, a computer-implement place recognition system, includes an object locator configured to accept an image of an unknown place and configurable to locate objects from a set of predefined classes in the image, and to determine an associated region of the image for each located object. The system also includes a descriptor generator configurable to, for each object of the set of objects located by the object locator, compute a descriptor comprising a numerical vector representing a respective located object based at least on the associated region of the image. A database is used for storing a plurality of reference records, each record has an association with a known place, and a set of descriptors for objects associated with that known place. A matcher is configured to, for each reference record of at least some of the reference records, determine a score representing a match between descriptors computed from the image of the unknown place and descriptors of the reference record. The place recognition system is configured to recognize the unknown place according to the best matching record.

Aspects may includes one or more of the following features.

Computing the set of descriptors from the image for the unknown place includes processing the image using an object locator to determine the set of objects in the image, a region of the image associated with each object of the set of objects, and processed features of the image associated with each region.

Computing the descriptors uses a descriptor generator, and includes for each object of the set of objects, inputting the processed features from the object locator and producing the corresponding descriptor as output.

The object locator comprises a first artificial neural network, and the descriptor generator comprises a second artificial neural network.

Determining the processed features of the image for an object includes using intermediate values generated within the first artificial neural network for the determined region of the object in the image.

The first artificial neural network is configured with values of first configuration parameters, where these values have been determined from a first training corpus comprising images annotated with objects according to the first set of object classes.

The second artificial neural network is configured with values of second configuration parameters, where these values have been determined from a second training corpus of images annotated with objects according to a second set of object classes, and of instances of objects within said classes. The second training corpus includes multiple images with a same instance of an object, and images with multiple different instances of an object class of the second set of object classes.

The second set of object classes is different than the first set of object classes, and the first training corpus is different than the second training corpus.

The values of the second configuration parameters are selected to distinguish different instances of an object class in the second set of object classes.

The values of the first configuration parameters are determined using an artificial neural network training procedure using the first training corpus.

The values of the second configuration parameters are determined using an artificial neural network training procedure using the second training corpus.

The training procedure used to determine the values of the second configuration parameters optimizes discriminability of object instances within each object class of the second set of object classes.

Matching the set of descriptors from the image for the unknown place with the records of the database includes matching the set of descriptors for the unknown place with a first set of descriptors of a first record of the database. The matching with the first set of descriptors includes determining a score between pairs of descriptors, each pair including one descriptor from the set of descriptors from the image for the unknown place and one descriptor from the first set of descriptors from the database. A best match of some or all of the descriptors of set of descriptors from the image for the unknown place each with a respective descriptor of the first set of descriptors is determined such that the best match has a corresponding best score determined from the scores between pairs of descriptors.

Matching the set of descriptors for the unknown place with a first set of descriptors of a first record of the database includes performing a graph matching procedure on a bipartite graphs with edge weights determined from the scores between pairs of descriptors.

Advantages of one or more embodiments relate to use of a generator of object descriptors that benefits from training on a large database of objects, while being adapted to distinguish different classes of objects as well as different instances of objects within each class in a target domain without requiring extensive training data from that domain. One advantage of using the large training databased is that the object description generator may be more robust of image acquisition conditions, such as illumination, point of view, etc.

Another advantage may include robust matching resulting from pairwise matching of objects of a subset of objects that are associated with a known place and objects found in an acquired image (or images) of an unknown place. Furthermore, by not relying on geometric relationship between the objects, the approach is robust to changes in point of view, and changes in location of objects at a place.

Other features and advantages of the invention are apparent from the following description, and from the claims.

DESCRIPTION

1 Overview

Figure 1:
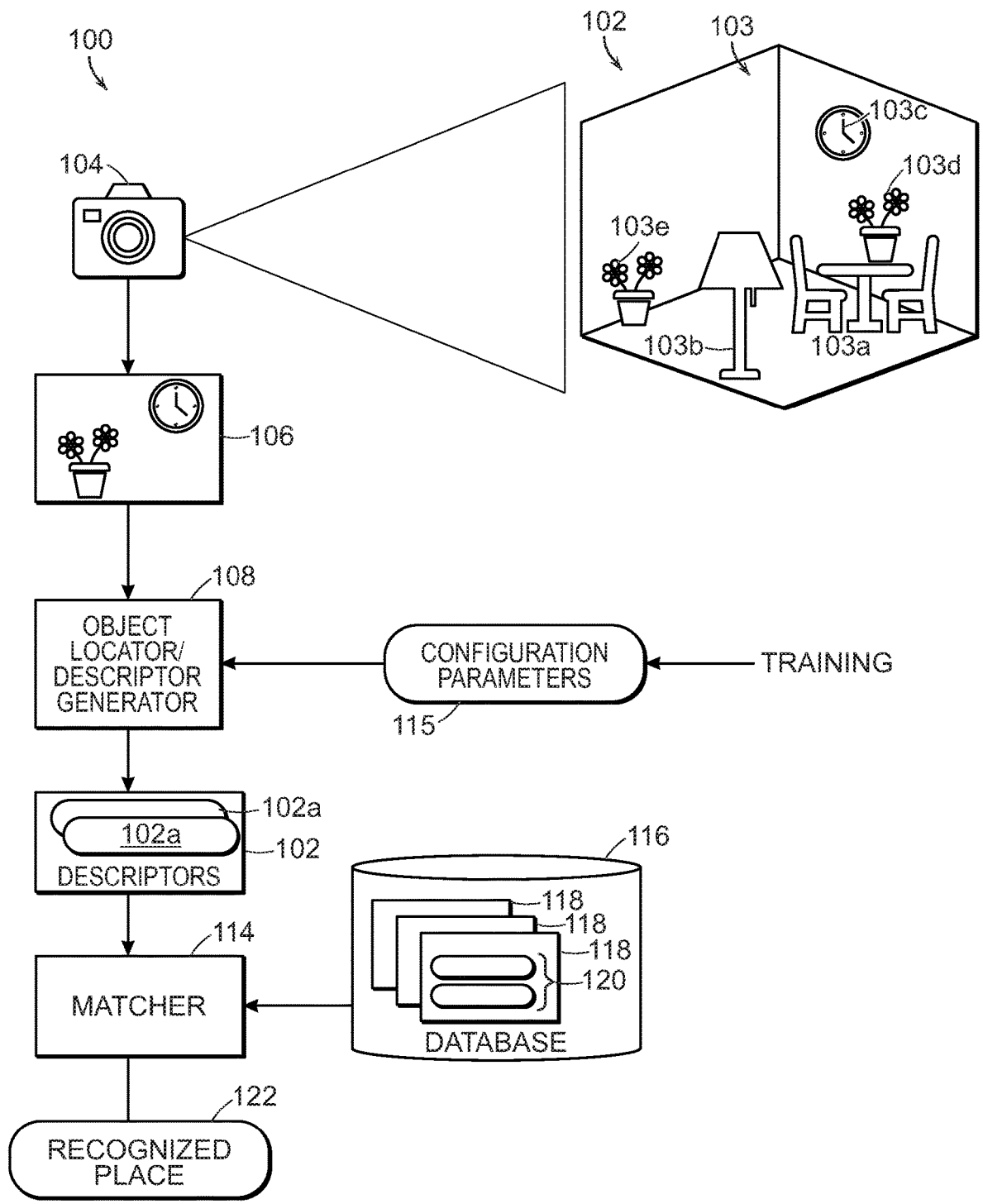
FIG. 1 is an exemplary place recognition system in operation, including a room to recognize for said operation.

Referring to FIG. 1, an example of a place recognition system 100 is used to identify an unknown place 102 by processing the image 106 of that place to identify objects in the image and compare those objects with objects associated with known places. For example, objects previously found at those known places are represented in a database 116 that associates known places with objects. The identifying of the objects involves determining a numerical descriptor (e.g., a fixed length real-valued vector) for each instance of an identified object in the image. As discussed further below, these descriptors have the property (or at least are designed to have the property) that they can distinguish types (classes) of objects (e.g., a clock as compared to a plant) as well as distinguish between different instances of objects within a same class (e.g., a clock with Arabic numerals versus a clock with Roman numerals). Optionally, the descriptors may also be designed distinguished between classes.

Figure 2:
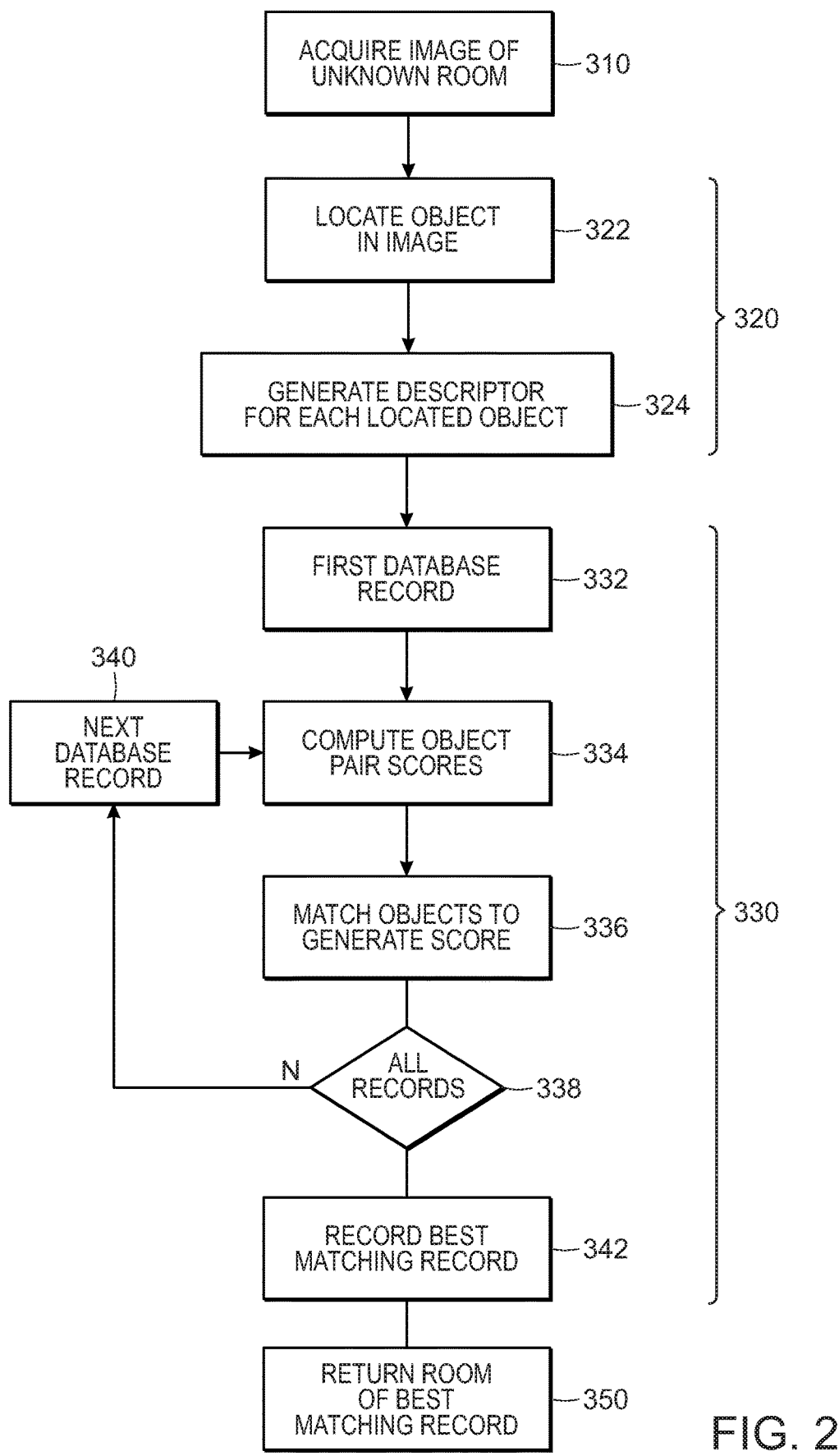
FIG. 2 is a flowchart detailing the steps taken by the place recognition system during operation.

In FIG. 1, operation of the system 100 during a recognition phase (i.e., as distinct from a prior training phase described below) is illustrated as applied to an exemplary problem of recognizing an unknown room 102 from a set of known rooms for which images have previously been obtained. Referring to FIG. 1, and a corresponding flowchart in FIG. 2, the identification process begins at step 310 with acquisition of an image 106 of the room 102 (or more generally a set of images, a sequence of video frames, etc.) using a camera 104 or other imaging device. For example, the image 106 is acquired after a user, robot, etc. enters the room. In the example illustrated in FIG. 1, the room 102 is illustrated as containing a set of physical objects 103, including a table 103*a*, a lamp 103*b*, a clock 103*c*, a first plant 103*d*, and a second plant 103*e*. The image 106 of the room is a two-dimensional representation of the room, and in general is a partial image of the three-dimensional room in the sense that the image 106 does not necessarily capture each of the objects 103*a-e*, and is essentially a rendering of a view of the room from a particular point of view. For example, only some of the objects in the room are captured based on the point of view of the camera. In this illustrative example, the image 106 includes a 2D representation of the clock 103*c* and the first plant 103*d*, but the table lamp 103*b* and the second plant 103*e* are outside the field of view and the table 103*a* is obstructed from view. Furthermore, the image does not necessarily have to match a point of view or lighting condition of a previous image of the room, which may have been used to train the system.

An object locator/descriptor generator 108 processes the image 106 to locate instances of objects in the image and to produce a set of descriptors 112 of the located objects (steps 320). In this example, the set of descriptors includes a first descriptor 112*a* corresponding to the clock 103*c* and a second descriptor 112*b* corresponding to the first plant 103*d*. As described in more detail below, in this embodiment, the object locator/descriptor generator 108 performs a sequence of two steps: first it makes a determination of what objects (i.e., classes of objects) it can locate in the image (step 322); then it processes a part of the image associated with each located object to determine the descriptor for the instance of that object (step 324) producing one descriptor for each object that is located in the previous step. Each of these steps makes use of a machine learning model that is configured with values of configuration parameters 110 provided to the locator/descriptor generator 108. Details of these machine-learning models and a process for determining the values of the configuration parameters ("training") is provided below.

Having determined the set of descriptors 112, the system applies a matcher 114 to compare the determined set with data in a database 116 (steps 330). In this embodiment, the database includes a set of records 118 ("reference records"). Each record 118 corresponds to a particular known room, and includes descriptors 120 of objects previously found in an image or set of images for that known room. Generally, the matcher goes through each record of the database (step 332 accessing the first record and step 340 for each subsequent record), matches the objects of the unknown room and the objects represented in the record (step 336), records which record 118 of the database best matches the set of descriptors 112 determined from the image 106 (step 342), and uses that best matching record to determine which known room best matches the unknown room to recognize the unknown room (step 350).

Each descriptor for the unknown room, as well as for each known room, has an associated object class identifier associated with it (not illustrated in FIG. 1). These object class identifiers are used by the matcher 114 in the matching procedure as discussed below.

The matcher 114 accommodates a reference record 118 for a known room having descriptors 120 for more objects than in the set of descriptors 112 determined in the image 106 for the unknown room, and also accommodates the set of descriptors 112 including objects not in the record in the database. For example, a new object may have been placed in the room after the database was formed, and as discussed above, certain objects may be omitted based on the point of view of the camera. Furthermore, the matcher 114 is configured to find a best association of descriptors (and their corresponding object instances), for example, when two similar objects are of present (e.g., two similar looking plants, such as plants 103d and 103e).

2 Object Locator/Descriptor Generator

As introduced above with reference to FIG. 1, the object locator/descriptor generator 108 in the present embodiment operates in two stages: object location, followed by descriptor generation. Each of these two stages is described below.

2.1 Object Locator

The object locator makes use of a convolutional neural network approach to process the pixels of an image 106 to determine bounding boxes of objects that correspond to a set of object types used in training of the object locator. Note however that there is not a requirement that the training of the object locator had examples of the specific object instances in the known rooms, or even had examples of the object classes in the rooms. Rather, the object locator can be considered to more generally identify a set of areas of interest in the image, and these areas of interest are then used for further processing, including the descriptor generator described below.

The object locator uses a Convolutional Neural Network (CNN) approach that is based on an approach referred to as "YOLOv2" as described in Redmon, Joseph, and Ali Farhadi. "YOLO9000: better, faster, stronger," In *Proceedings of the IEEE conference on computer vision and pattern recognition*, pp. 7263-7271, 2017, which is incorporated herein by reference. Very generally, an output of a YOLOv2 system that has processing an images includes a set of located objects, where for each objects in the outputs includes: a bounding box (4 values), a confidence/object detection score (1 value), and object class probabilities (1 value per class, e.g., 20 values for 20 object classes).

In the use of the YOLOv2 approach in the object locator, a further output is extracted for each located object. In particular, the confidence/object detection value is computed in an output unit of the output layer of a neural network, and the inputs to that output unit are used as features for further processing. Note that in the YOLOv2 architecture, these values include the outputs of the next-to-last layer of the neural network, as well as outputs from one or more lower-level layers brought forward in a "skip connection" architecture. In this embodiment, the number of values thus representing the object has 1024 values. These NNN-dimensional representations across an object are referred to as a the "features" of the object, and for a bounding box of size M by N, there are effectively M*N*NNN values representing the instance of the object.

2.2 Descriptor Generator

The descriptor generator receives the outputs of the object locator. In this embodiment, it only uses the M*N*NNN features, and disregards the class probabilities, confidence, and specific location of the bounding box.

Figure 3:
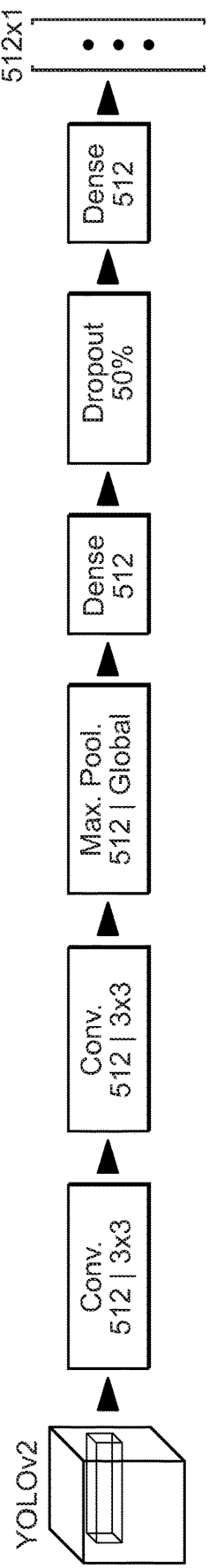
FIG. 3 is a block diagram of a descriptor generator

Referring to FIG. 3, the descriptor generator is a convolutional neural network with two convolutional layers and two dense layers, where the output of the last layer is the output descriptor. To account for the variable sized input resulting from the variable size bounding box determined by the object locator, a global "max. pooling" is performed on the output of the convolutional layers. The output of the descriptor generator is a vector of 512 real values.

3 Matcher

As introduced above, a function of the matcher is to compare a set of descriptors 112 for an unknown room with the set of descriptors 120 for each known room in the database. The matcher forms a score between two such sets (step 336 of FIG. 2), where the greater that score, the more similar the descriptors.

The score between two sets of descriptors, say a set of N descriptors for the unknown room and M descriptors for a known room, is determined by first computing a pairwise distance between descriptors of the same class, one descriptor from the unknown room and one from the known room. In this implementation, a Euclidean distance, $\|d_a - d_b\|$, between the descriptors a and b is used as the distance.

Rather than using the Euclidean distances directly, a descriptor d from the unknown room, which is associated with an object class q (i.e., determined by the object locator), is compared against all $N_q$ descriptors of the same class in any known room of the database 116 (i.e., pooled from all the records). That is, the known descriptors for the class may be represented as $d_1, d_2, \ldots, d_{N_q}$. A score between the descriptor d and a particular descriptor $d_i$ in the database is defined by the rank of that descriptor, ordered by the distance a $\|d - d_i\|$. This rank, $r_i = \text{rank}(d_i, d, q)$, with the best match being rank 1, and the worst match being rank $N_q$, is transformed to a score as $s_i = \exp(-10 \, r_i \, N_q^{-1})$, where the scale value 10 is determined experimentally. That is, the worst matching descriptor of the same class will have a score of $s_{min}=\exp(-10)$ (i.e., close to zero), while the best matching descriptor will have a score of $s_{max}=\exp(-10\ N_q^{-1})$, for example a range from $5\times10^{-5}$ to 0.9 for $N_q=100$, or to approximately 1.0 for $N_q>1000$.

At least conceptually, a relationship between the descriptors of the unknown room and one of the known rooms may be represented as a bipartite graphs where N nodes corresponding to the N descriptors for the unknown room may be linked to M nodes of the known room via up to N*M links, each weighted by the score between the descriptors associated with that link. Note that nodes of different classes are not linked. The score between the two sets of descriptors is then determined according to a matching of the nodes, for example, using a matching algorithm as described in Galil, Zvi, "Efficient algorithms for finding maximum matching in graphs." *ACM Computing Surveys (CSUR)* 18, no. 1 (1986): 23-38, which is incorporated herein by reference. That is, the goal is to maximize the sum of the scores of the matched descriptors, subject to the constraint that each descriptor may match either zero or one descriptors of the other set (i.e., a descriptor from the unknown place set may not match more than one descriptor from the set for the known place, and a descriptor from the set for the known place may not match more than one descriptor from the set for the unknown place). It should be understood that this matching may be efficiently implemented as a max flow problem, as described in the referenced Zvi article. Therefore there is one scalar real-valued score between the set of descriptors for the unknown room, and the set of descriptors for each of the known rooms.

As introduced above, the matcher considers each record (i.e., each room) in the database, and returns the record with the maximum graph matching score as the recognized room.

4 Training

As introduced above, the object locator/descriptor generator 108 (see FIG. 1) is parameterized with values of configuration parameters 110. Also as described above, there are two components of the object locator/descriptor generator: the object locator, and the descriptor generator. Each of these components has separate configuration parameters that are determined using separate training procedures

4.1 Object Locator Training

The object locator is trained using a database of images, where each image includes a class label and bounding box annotations for various objects from a defined set of object classes that may be found in the image. In some experiments, the object detector is trained using the COCO dataset (T.-Y. Lin, M. Maire, S. Belongie, J. Hays, P. Perona, D. Ramanan, P. Dollar, and C. L. Zitnick, "Microsoft COCO: Common Objects in Context," In *ECCV*, 2014) and the ADE20K dataset (B. Zhou, H. Zhao, X. Puig, S. Fidler, A. Barriuso, and A. Torralba, "Scene Parsing through ADE20K Dataset," In *CVPR*, 2017). These datasets contain images with bounding box annotations for various object categories. From the COCO dataset, which has 80 object categories annotated, only 15 categories that appear in indoor environments and are relatively static were used. Additionally, by merging some of the more specific categories in the ADE20K dataset another 10 different object categories were formed. The selected categories appear in the COCO dataset in approximately 45 k images and in the ADE20K dataset in approximately 10 k images.

4.2 Descriptor Generator Training

A The goal of training of the descriptor generator is to generate descriptors that have a small Euclidean distance when comparing the same object instance and have a high Euclidean distance when they are from different object instances. Note that in the matching procedure described above, only descriptors for objects deemed by the object locator to be of the same class are compared. The training procedure determines the weights of the neural network with the structure shown in FIG. 3.

The training procedure uses a "triplet" loss function, as described in F. Schroff, D. Kalenichenko, and J. Philbin, "FaceNet: A Unified Embedding for Face Recognition and Clustering," In *CVPR*, 2015. The triplet loss is based on image triplets that are formed from an anchor, a positive sample and a negative sample. In the present training approach, these are features from a reference object, the same object instance in a different image, and from any other object. The negative sample may from any class thereby providing robustness to the descriptor against misclassification. As the training proceeds the share of objects in the negative samples that come from a different class reduces due to the semi-hard triplet selection process.

The triplet loss is calculated using the descriptors generated from the anchor, positive and negative samples, denoted as $desc_a$, $desc_p$ and $desc_n$ respectively.

Afterwards the Euclidean distance between the anchor descriptor and the other two descriptors is calculated according to $$d_p=\|desc_a-desc_p\|, \text{ and } d_n=\|desc_a-desc_n\|$$

and using $d_p$ and $d_n$, the triplet loss L is defined as $$L=\max(0,d_p-d_n+M),$$

where M is a margin parameter denoting the minimum desired separation between positive and negative samples.

During descriptor training, the object detector network weights are kept fixed by not propagating the triplet loss back to the object detection part of the network (i.e., the features generated by the object locator network do not change during training of the descriptor generator). To guarantee convergence and speed up the training process, two conditions on the training regime are used, following the Schroff reference cited above. The first condition is that we perform the training by only using semi-hard triplets, i.e. triplets that respect the condition $d_p<d_n$. This condition only allows triplets where a correct separation between the positive and negative samples already exists and can potentially be improved on, if it is smaller than the margin. Not starting with the hardest triplets avoids overwhelming the classifier early on and causes it to converge to a constant mapping of $f(x)=0$. Later during the training as the descriptive power of the network increases, so does the difficulty of the formed triplets.

The second condition imposed on the training process is the use of mini-epochs. An epoch is formed by randomly selecting a limited number of object instances and only taking a certain amount of images representing each of the selected objects. All viable positive pairings are formed from these images, with negative samples chosen randomly from the whole dataset. Similarly, this restriction avoids overwhelming the descriptor by focusing on only small parts of the dataset at a time.

The descriptor generator is trained on different data than the object locator. One reason is that the datasets used for the object locator do not contain information on the association of object instances across images. Therefore, the Matterport3D dataset, which is a collection of annotated 3D meshes and images containing mostly residential houses, was used (Chang, Angel, Angela Dai, Thomas Allen Funkhouser, Maciej Halber, Matthias Niebner, Manolis Savva, Shuran Song, Andy Zeng, and Yinda Zhang. "Matterport3D: Learning from RGB-D data in indoor environments." In 7th IEEE International Conference on 3D Vision, 3DV 2017, pp. 667-676. Institute of Electrical and Electronics Engineers Inc., 2018). The Matterport3D data was restricted to keep only the bounding box annotations where the object locator was able to detect a similar object with an Intersection Over Union (IoU) of the bounding boxes of over 0.5. With this criterion, a total of approximately 2000 objects with a total of 16 k instances were used.

It should be noted that the Matterport3D dataset may vary in pose, but since each house was only imaged once there are no variations in lighting for different instances of the same object.

5 Database Construction

The construction of the database 116 of known places is independent of the training of the object locator and the descriptor generator. In some examples, the images from known rooms are collected, and the descriptors are generated in the same manner as illustrated in FIG. 1 for an unknown room. The set of descriptors for that known room is then stored in the database in association with the identifier for the known room. During matching, after the best matching set of descriptors is determined, corresponding to one image from a known room, that identifier for the known room is available to return as the recognition result.

6 Alternatives and Implementations

It should be recognized that alternative structures of the object locator/descriptor generator may be used. For example, the object locator and the descriptor generator may be combined into one neural network and trained together. Further, other types of machine learning techniques (e.g., as opposed to CNNs) may be used for these components.

Alternative matching scores may be used as well other distance or score approaches may be used, and different approaches to the matching of detected objects and reference objects may be used, preferably using trained instance descriptors rather than merely relying on classes of detected objects.

In some alternatives, rather than matching a best prior image of a place, multiple images of a place may be combined to form a combined reference record that includes all objects found in multiple viewpoints of a place. Also, the descriptors for objects may be derived from multiple images (e.g., averaged) rather than maintaining different descriptors from different reference images.

It is noted alternative other approaches may make use of 3D geometric relationships between objects. Such geometric considerations, for example, generate higher scores if the objects are in compatible geometric relationships in a reference image and an unknown image.

The approaches are applicable to other types of problems than merely recognition from a known set of places. Similar score approaches may be used for unsupervised clustering of images that are not labelled by place, and in applications such as simultaneous localization and mapping (SLAM) when similarity of an image of a place may be compared to previous images in a mapping task.

The techniques described above may be implemented in software, in hardware, or using a combination of software and hardware. Different systems may be used for different aspects of the approach, such as training of the object locator, the descriptor generator, and construction of the reference database. The software, which may be stored on a non-transitory machine-readable medium, may include instructions for execution on a general-purpose processor, a particular processor architecture such as a parallel architecture as found in a Graphics Processor Unit (GPU), or a virtual processor. The hardware my include an application-specific integrated circuit (ASIC), or a configurable circuit (e.g., a Field Programmable Gate Array, FPGA), and the hardware may be represented in a design structure stored on a machine-readable medium, with the design structure including instructions (e.g., Verilog) for use inf a process of fabricating the hardware.

It is to be understood that the foregoing description is intended to illustrate and not to limit the scope of the invention, which is defined by the scope of the appended claims. Other embodiments are within the scope of the following claims.

What is claimed is:

1. A method for place recognition, comprising:
receiving an image acquired for an unknown place;
computing a set of descriptors from the image for the unknown place, the computing including
locating objects from a first set of predefined classes in the image, including determining a corresponding region of the image for each located object, and
computing each descriptor to comprise a numerical vector representing a respective located object based at least on the associated region of the image;
accessing a database of reference records, each reference record being associated with a known place and including a set of descriptors previously computed for objects in a corresponding image of said known place;
matching the set of descriptors from the image for the unknown place with the reference records of the database, including
for each reference record of at least some of the reference records, determining a score representing a match between descriptors computed from the image of the unknown place and descriptors of the reference record, and
determining a best matching reference record of the database; and
recognizing the unknown place as being a place associated with the best matching record of the database.

2. The method of claim 1, wherein computing the set of descriptors from the image for the unknown place includes:
processing the image using an object locator to determine
the set of objects in the image,
a region of the image associated with each object of the set of objects, and
processed features of the image associated with each region; and
computing the descriptors using a descriptor generator, including for each object of the set of objects,
inputting the processed features and
producing the corresponding descriptor as output.

3. The method of claim 2, wherein the object locator comprises a first artificial neural network, and the descriptor generator comprises a second artificial neural network.

4. The method of claim 3, wherein determining the processed features of the image for an object includes using intermediate values generated within the first artificial neural network for the determined region of the object in the image.

5. The method of claim 3, further comprising configuring the first artificial neural network with values of first configuration parameters, said values having been determined from a first training corpus comprising images annotated with objects according to the first set of object classes.

6. The method of claim 5, further comprising configuring the second artificial neural network with values of second configuration parameters, said values having been determined from a second training corpus of images annotated with objects according to a second set of object classes, and of instances of objects within said classes, the second training corpus including multiple images with a same instance of an object, and images with multiple different instances of an object class of the second set of object classes.

7. The method of claim 6, wherein the second set of object classes is different than the first set of object classes, and the first training corpus is different than the second training corpus.

8. The method of claim 6, wherein the values of the second configuration parameters are selected to distinguish different instances of an object class in the second set of object classes.

9. The method of claim 6, further comprising determining the values of the first configuration parameters using an artificial neural network training procedure using the first training corpus.

10. The method of claim 6, further comprising determining the values of the second configuration parameters using an artificial neural network training procedure using the second training corpus.

11. The method of claim 10, wherein the training procedure used to determine the values of the second configuration parameters comprises optimizing discriminability of object instances within each object class of the second set of object classes.

12. The method of claim 1, wherein matching the set of descriptors from the image for the unknown place with the records of the database, includes matching the set of descriptors for the unknown place with a first set of descriptors of a first record of the database, including:
determining a score between pairs of descriptors, each pair including one descriptor from the set of descriptors from the image for the unknown place and one descriptor from the first set of descriptors from the database;
determining a best match of some or all of the descriptors of set of descriptors from the image for the unknown place each with a respective descriptor of the first set of descriptors, the best match having a corresponding best score determined from the scores between pairs of descriptors.

13. The method of claim 12, wherein matching the set of descriptors for the unknown place with a first set of descriptors of a first record of the database includes performing a graph matching procedure on a bipartite graphs with edge weights determined from the scores between pairs of descriptors.

14. The method of claim 1, wherein locating the objects includes using a first artificial neural network configured with values determined from a first training corpus comprising images annotated with objects according to the first set of predefined classes.

15. The method of claim 1, wherein matching the set of descriptors from the image for the unknown place with the records of the database includes matching the set of descriptors for the unknown place with a first set of descriptors of a first record of the database, including:
determining correspondences between respective descriptors from the image for the unknown place and descriptors from the first set of descriptors.

16. A computer-implement place recognition system, comprising:
an object locator configured to accept an image of an unknown place and configurable to locate objects from a set of predefined classes in the image, and to determine an associated region of the image for each located object;
descriptor generator configurable to, for each object of the set of objects located by the object locator, compute a descriptor comprising a numerical vector representing a respective located object based at least on the associated region of the image;
a database for storing a plurality of reference records, each record has an association with a known place, and a set of descriptors for objects associated with said known place; and
a matcher configured to, for each reference record of at least some of the reference records, determine a score representing a match between descriptors computed from the image of the unknown place and descriptors of the reference record, and
wherein the place recognition system is configured to recognize the unknown place according to the best matching record.

17. The place recognition system of claim 16, wherein the object locator comprises a first artificial neural network, and the descriptor generator comprises a second artificial neural network, configurable according to values of first configuration parameters and second configuration parameters, respectively.

18. The place recognition system of claim 17 configured with values of the first and the second configuration parameters, the values of the first configuration parameters having been determined from a first training corpus comprising images annotated with objects according to the first set of object classes, and values of the second configuration parameters having been determined from a second training corpus of images annotated with objects according to a second set of object classes.

* * * * *